(12) United States Patent
Shimanaka

(10) Patent No.: US 11,316,888 B2
(45) Date of Patent: Apr. 26, 2022

(54) MALWARE INSPECTION SUPPORT SYSTEM AND MALWARE INSPECTION SUPPORT METHOD

(71) Applicant: FUJITSU LIMITED, Kawasaki (JP)

(72) Inventor: Toru Shimanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 390 days.

(21) Appl. No.: 16/586,383

(22) Filed: Sep. 27, 2019

(65) Prior Publication Data

US 2020/0128026 A1 Apr. 23, 2020

(30) Foreign Application Priority Data

Oct. 17, 2018 (JP) .............................. JP2018-195886

(51) Int. Cl.
*H04L 29/06* (2006.01)
*G06F 21/56* (2013.01)
*H04L 61/103* (2022.01)

(52) U.S. Cl.
CPC .......... *H04L 63/145* (2013.01); *G06F 21/566* (2013.01); *H04L 61/103* (2013.01)

(58) Field of Classification Search
CPC . H04L 63/145; H04L 61/103; H04L 63/1491; H04L 61/2514; G06F 21/566; G06F 21/561
See application file for complete search history.

(56) References Cited

U.S. PATENT DOCUMENTS

| 8,566,946 | B1 | 10/2013 | Aziz et al. |
| 8,898,788 | B1 | 11/2014 | Aziz et al. |
| 10,044,675 | B1 * | 8/2018 | Ettema ................ H04L 63/1491 |
| 2006/0173872 | A1 | 8/2006 | Koike et al. |
| 2007/0079366 | A1 | 4/2007 | Geffner |

(Continued)

FOREIGN PATENT DOCUMENTS

| JP | 2006-190127 | 7/2006 |
| JP | 2007-058398 | 3/2007 |

(Continued)

OTHER PUBLICATIONS

Great Britain Search Report dated May 26, 2020 for corresponding United Kingdom Patent Application No. GB1918905.9 (3 pages).

(Continued)

*Primary Examiner* — Huan V Doan
(74) *Attorney, Agent, or Firm* — Fujitsu Patent Center

(57) ABSTRACT

A malware inspection support system includes one or more processors configured to, when a first terminal belonging to a first system is infected with malware, in response to receiving, from the first terminal, a first packet destined for a second terminal belonging to the first system, change a destination address of the first packet to an address of a third terminal belonging to a second system, and transmit the changed first packet to the third terminal, generate a port group by grouping a first port to which the first terminal is coupled and a second port to which the second system is coupled, transmit a broadcast packet received from the first terminal to the port group, and change a source address of another broadcast packet received from the third terminal to an address of the second terminal, and transmit the changed other broadcast packet to the port group.

12 Claims, 9 Drawing Sheets

(56) References Cited

U.S. PATENT DOCUMENTS

2010/0118717 A1    5/2010  Suzuki et al.
2012/0254951 A1   10/2012  Munetoh et al.
2017/0223052 A1    8/2017  Stutz
2019/0349297 A1*  11/2019  Ma .......................... H04L 49/25

FOREIGN PATENT DOCUMENTS

| JP | 2008-172548 A | 7/2008 |
| JP | 2012-212391 A | 11/2012 |
| JP | 2012-234503 | 11/2012 |
| WO | 2013/032473 A1 | 3/2013 |

OTHER PUBLICATIONS

USPTO—Non-Final Office Action dated Dec. 27, 2021 for U.S. Appl. No. 16/724,487 [pending].

* cited by examiner

MALWARE INSPECTION SUPPORT SYSTEM AND MALWARE INSPECTION SUPPORT METHOD

CROSS-REFERENCE TO RELATED APPLICATION

This application is based upon and claims the benefit of priority of the prior Japanese Patent Application No. 2018-195886, filed on Oct. 17, 2018, the entire contents of which are incorporated herein by reference.

FIELD

The embodiments discussed herein are related to malware inspection support techniques.

BACKGROUND

In recent years, cyberattacks, such as unauthorized access via a network, have raised serious concerns. To deal with such cyberattacks, it is important to collect cyber threat intelligence (CTI) in which information on attackers, purposes, attack techniques, attack methods, and so on obtained by observing the cyberattacks is summarized in a report or the like. As existing techniques for collecting CTI, unauthorized access information systems that monitor unauthorized access to a honeynet and collect unauthorized access information are known.

Related techniques are disclosed in, for example, Japanese Laid-open Patent Publication No. 2008-172548 and Japanese Laid-open Patent Publication No. 2012-212391.

SUMMARY

According to an aspect of the embodiments, a malware inspection support system includes one or more processors configured to, when a first terminal belonging to a first system is infected with malware, in response to receiving, from the first terminal, a first packet destined for a second terminal belonging to the first system, change a destination address of the first packet to an address of a third terminal belonging to a second system, and transmit the changed first packet to the third terminal, generate a port group by grouping a first port to which the first terminal is coupled and a second port to which the second system is coupled, transmit a broadcast packet received from the first terminal to the port group, and change a source address of another broadcast packet received from the third terminal to an address of the second terminal, and transmit the changed other broadcast packet to the port group.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
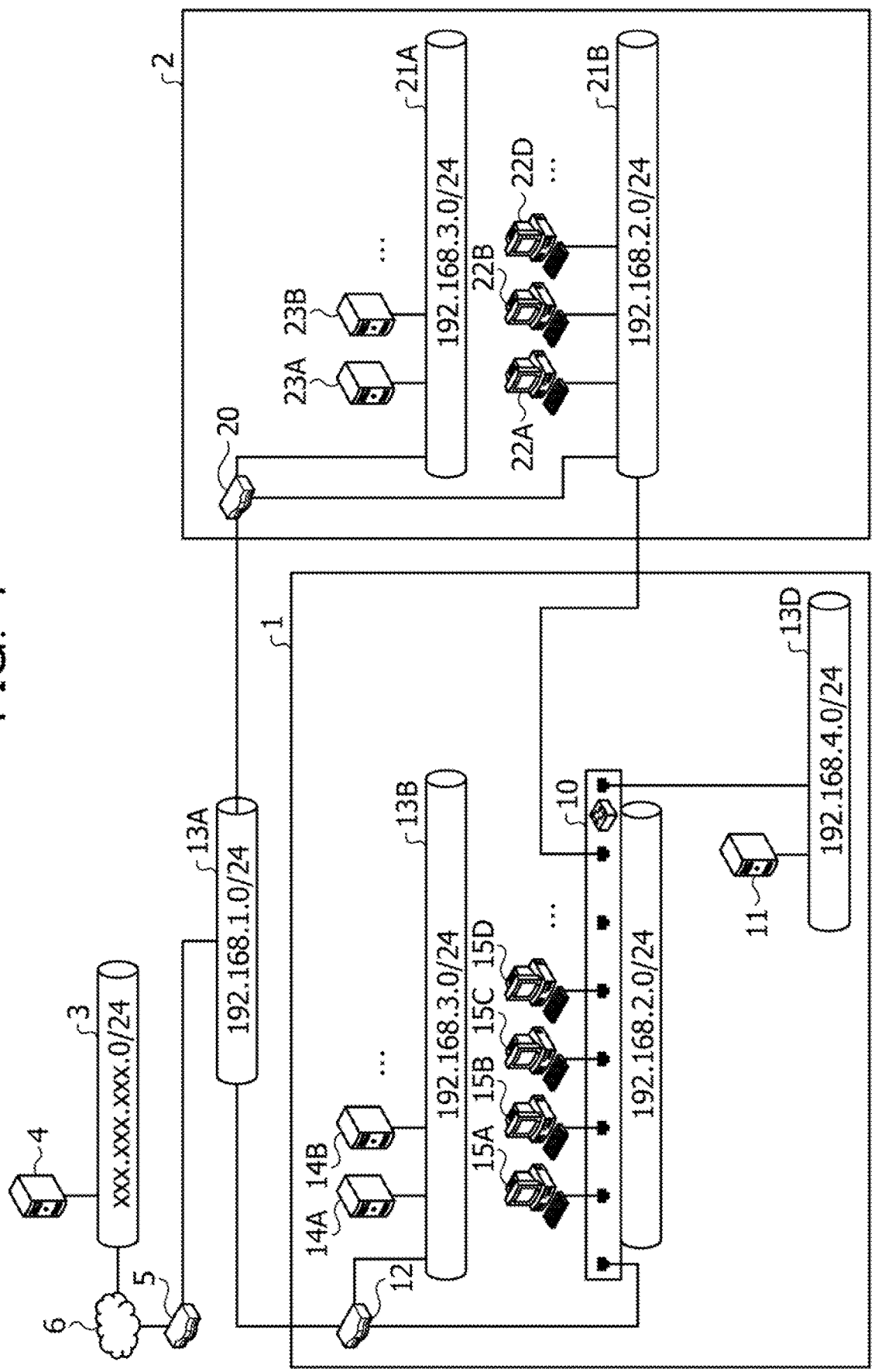
FIG. 1 is a diagram illustrating an example of a configuration of a system.

With the existing techniques, in which unauthorized access from outside of the system of a company is monitored by a dedicated honey pot and CTI is collected, it is difficult to safely monitor the behavior of personal computers (PCs) and the like infected with malware in a system controlled by a command and control (C&C) server located outside the system, and to collect CTI.

Hereinafter, a malware inspection support system, a malware inspection support apparatus, a malware inspection support method, and a malware inspection support program according to embodiments will be described with reference to the accompanying drawings. In embodiments, the same reference numerals are used for a configuration having the same functions and redundant description thereof is omitted. A malware inspection support system, a malware inspection support apparatus, a malware inspection support method, and a malware inspection support program described in the following embodiments are merely exemplary and are not intended to limit embodiments. The following embodiments may be combined as appropriate to the extent inconsistent therewith.

FIG. 1 is a diagram illustrating an example of a configuration of a system. As illustrated in FIG. 1, a system according to an embodiment includes a company network system 1 in a company or the like and a honey network system 2 in which the network configuration of the company network system 1 is mimicked. The company network system 1 is an example of a first system and the honey network system 2 is an example of a second system. The system according to the embodiment is an example of a malware inspection support system.

The company network system 1 is coupled to an external network 3 with a classless inter-domain routing (CIDR) notation of, for example, xxx.xxx.xxx.0/24 via a network address translation (NAT) router 5 and the Internet 6. The external network 3 includes a C&C server 4 that plays a role of, for example, issuing an instruction to a terminal in the company network system 1 infected with malware to control the terminal.

The company network system 1 includes an OpenRow switch 10, an OpenFlow controller 11, a NAT router 12, servers 14A, 14B, . . . , and terminals 15A, 15B, 15C, . . . .

The OpenFlow switch 10 is a network switch that relays and forwards data between devices coupled to ports under control of the OpenRow controller 11, and is an example of a communication device. The OpenFlow controller 11 delivers a flow table related to path control, such as operations on packets under given conditions, to the OpenFlow switch 10 by using an OpenFlow protocol and sets the flow table. According to the embodiment, the communication device is an example of a malware inspection support apparatus.

The flow table delivered to and set in the OpenFlow switch 10 by the OpenFlow controller 11 is created by a setting operation performed by a network administrator or the like of the company network system 1. In the flow table, operations, such as packet passage/interception, replacement of media access control (MAC) addresses and Internet protocol (IP) addresses, and changing of output ports, in the fields of physical port numbers, source and destination MAC addresses, source and destination IP addresses, transmission control protocol (TCP)/user datagram protocol (UDP) port numbers, and the like are presented. The OpenFlow switch 10 performs forwarding and discarding of data, replacement of destination addresses, and the like based on the set flow table.

Figure 2:
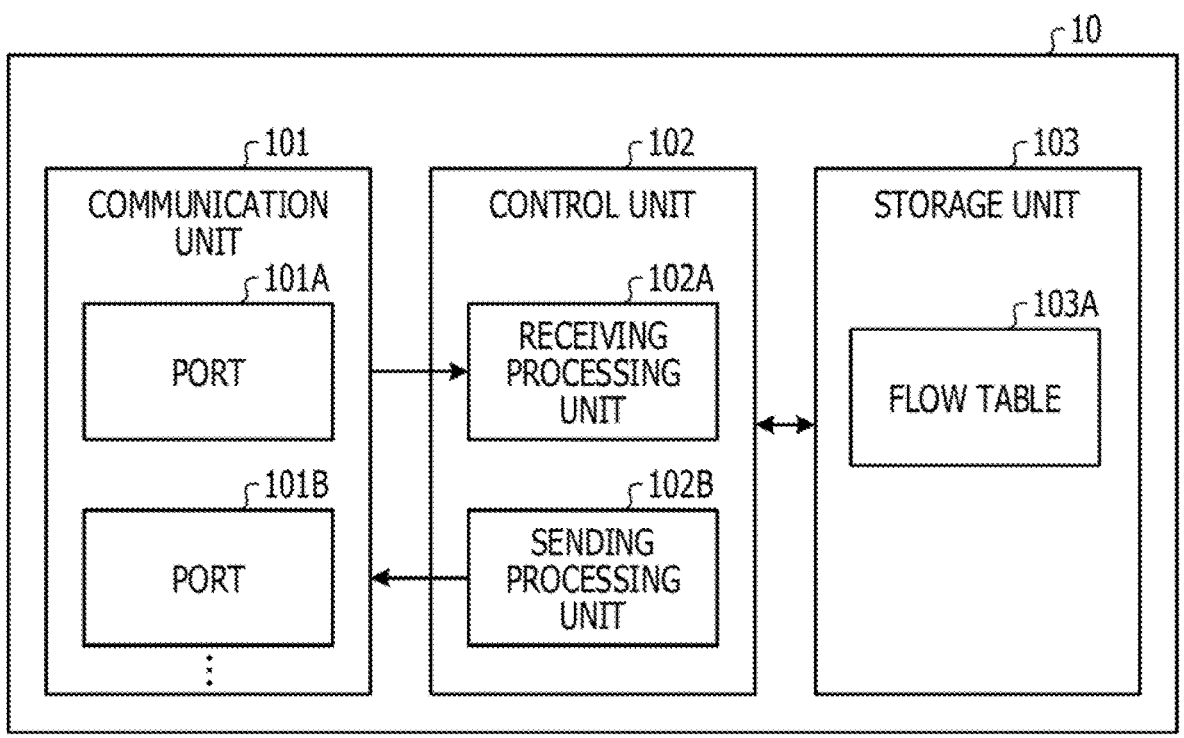
FIG. 2 is a block diagram illustrating a functional configuration of a communication device according to an embodiment.

FIG. 2 is a block diagram illustrating a functional configuration of a communication device according to the embodiment, that is, the OpenFlow switch 10 and an OpenFlow switch 10a. As illustrated in FIG. 2, the OpenFlow switch 10 includes a communication unit 101, a control unit 102, and a storage unit 103.

The communication unit 101 is a communication interface that performs data communication using packets with devices (for example, the terminals 15A, 15B, 15C, . . . ) coupled thereto via ports 101A, 101B, . . . under control of the control unit 102.

The control unit 102 includes a receiving processing unit 102A and a sending processing unit 102B and controls operations of the OpenFlow switch 10. For example, the control unit 102 controls forwarding and discarding of data, replacement of destination addresses, and the like among devices coupled to the ports 101A, 101B, . . . based on a flow table 103A stored in the storage unit 103.

The storage unit 103 is a storage device such as, for example, a hard disk drive (HDD) or a semiconductor memory and stores therein the flow table 103A delivered by the OpenFlow controller 11.

The receiving processing unit 102A performs reception processing to receive packets sent by devices (for example, the terminals 15A, 15B, 15C, . . . of the company network system 1, the terminals 22A, 22B, . . . of the honey network system 2, and so on) coupled to the ports 101A, 101B, . . . . That is, the receiving processing unit 102A is an example of a receiving unit.

The sending processing unit 102B references the flow table 103A stored in the storage unit 103 and, based on the flow table 103A, performs sending processing to send packets received by the receiving processing unit 102A to the destination devices (for example, the terminals 15A, 15B, 15C, . . . of the company network system 1, the terminals 22A, 22B, . . . of the honey network system 2, and so on). That is, the sending processing unit 102B is an example of a sending unit.

For example, the sending processing unit 102B outputs (sends) packets that meet conditions described in the flow table 103A, from the ports 101A, 101B, . . . , through operations (for example, packet passage/interception, replacement of MAC addresses and IP addresses, and changing of output ports) described according to the conditions.

The network address translation (NAT) router 12 is a router device that translates IP addresses and the like to couple networks 13A to 13C in the company network system 1 to the external network 3.

The network 13A is a network, with a CIDR notation of, for example, 192.168.1.0/24, to which the NAT router 12 in the company network system 1 and a NAT router 20 in the honey network system 2 belong. The network 13B is a network, with a CIDR notation of, for example, 192.168.3.0/24, to which the servers 14A, 14B, . . . in the company network system 1 belong.

The network 13C is a network, with a CIDR notation of, for example, 192.168.2.0/24, to which the terminals 15A, 15B, 15C, . . . in the company network system 1 belong. The network 13D is a network, with a CIDR notation of, for example, 192.168.4.0/24, to which the OpenFlow controller 11 belongs.

The OpenFlow switch 10 is coupled to the terminals 15A, 15B, 15C, . . . at the respective ports and is coupled to the network 13D and a network 21B of the honey network system 2 at predetermined ports.

The servers 14A, 14B, . . . are server devices such as Web servers belonging to the company network system 1. Hereinafter, the servers 14A, 14B, . . . may be referred to as servers 14 if they are not to be discriminated from one another.

The terminals 15A, 15B, 15C, . . . belong to the company network system 1 and are information processing devices, such as personal computers (PCs) that are used by users. That is, the terminals 15A, 15B, 15C, . . . are examples of an information processing device belonging to the first system. Hereinafter, the terminals 15A, 15B, 15C, . . . may be referred to as terminals 15 if they are not to be discriminated from one another.

The honey network system 2 includes the NAT router 20, the terminals 22A, 22B, . . . , and servers 23A, 23B, . . . .

The NAT router 20 is a router device that translates IP addresses and the like to couple the network 13A to networks 21A and 21B in the honey network system 2.

The network 21A is a network, with a CIDR notation of, for example, 192.168.3.0/24, to which the servers 23A, 23B, . . . in the honey network system 2 belong. The network 21B is a network, with a CIDR notation of, for example, 192.168.2.0/24, to which the terminals 22A, 22B, . . . in the honey network system 2 belong.

The terminals 22A, 22B, . . . , which belong to the honey network system 2, are information processing devices prepared so as to correspond to the terminals 15A, 15B, . . . in the company network system 1. For example, the terminals 22A, 22B, . . . have the same network names and IP addresses as the terminals 15A, 15v, . . . , respectively, in the network 21B of 192.168.2.0/24, which is the same as for the terminals 15A, 15V, . . . . For example, the terminal 22A has the same network name and IP address as the terminal 15A, and the terminal 22B has the same network name and IP address as the terminal 15B. In terms of the MAC addresses, the terminal 22A and the terminal 15A, as well as the terminal 22B and the terminal 15B, differ from each other. For IP addresses, although IPv4 addresses are illustrated by way of example, IPv6 may be implemented under the same concept.

The servers 23A, 23B, . . . , which belong to the honey network system 2, are server devices prepared so as to correspond to the servers 14A, 14B, . . . in the company network system 1. For example, the servers 23A, 23B, . . . have the same network names and IP addresses as the terminals 14A, 14B, . . . , respectively, in the network 21A of 192.168.3.0/24, which is the same as for the terminals 14A, 14B, . . . . For example, the server 23A has the same network name and IP address as the server 14A, and the server 23B has the same network name and IP address as the server 14B. In terms of the MAC addresses, the server 23A and the server 14A, as well as the server 23B and the server 14B, differ from each other.

In such a manner, the terminals 22A, 22B, . . . in the honey network system 2 mimic the terminals 15A, 15B, . . . of the company network system 1, respectively, the servers 23A, 23B, . . . of the honey network system 2 mimic the servers 14A, 14B, . . . of the company network system 1, respectively, and the honey network system 2 is a system that mimics the company network system 1.

If the user (for example, a network administrator) of the company network system 1 has not detected the terminal 15 infected with malware, the user sets the flow table 103A for performing operations in a normal mode, in which sending and receiving of packets between the company network system 1 and the honey network system 2 is interrupted, in the OpenFlow switch 10 by the OpenFlow controller 11. Thus, in the normal mode, sending and receiving of packets between the company network system 1 and the honey network system 2 is interrupted by the OpenFlow switch 10.

It is assumed that the terminal 15 infected with malware (in the present embodiment, assuming that the terminal 15C is infected with malware) has been detected by a malware detection program or the like. In this case, the user sets the flow table 103A for performing operations in a deception mode, in which packets sent and received by the terminal 15C infected with malware are directed to the honey network system 2, in the OpenFlow switch 10 by the OpenFlow controller 11.

For example, the flow table 103A is set as follows:

For an address resolution protocol (ARP) frame from the terminal 22 of the honey network system 2 to the terminal 15C infected with malware, replace the source MAC address and the source MAC address information in the protocol of the terminal 22 with those of the terminal 15.

For a neighbor discovery protocol (NDP) packet from the terminal 22 of the honey network system 2 to the terminal 15C infected with malware, replace the source MAC address of the terminal 22 with that of the terminal 15. In the case of Neighbor Solicitation, replace the source MAC address information in the protocol of the terminal 22 with that of the terminal 15. In the case of Neighbor Advertisement, replace the destination MAC address information in the protocol of the terminal 22 with that of the terminal 15.

For an ARP frame from the NAT router 20 of the honey network system 2 to the terminal 15C infected with malware, replace the source MAC address and the source MAC address information in the protocol of the NAT router 20 with those of the NAT router 12.

For an NDP packet from the NAT router 20 of the honey network system 2 to the terminal 15C infected with malware, replace the source MAC address of the NAT router 20 with that of the NAT router 12. In the case of Neighbor Solicitation, replace the source MAC address information in the protocol of the NAT router 20 with that of the NAT router 12. In the case of Neighbor Advertisement, replace the destination MAC address information in the protocol of the NAT router 20 with that of the NAT router 12.

For ARP frames from the terminal 15C infected with malware to the terminals 15A, 15B, . . . , replace the destination MAC addresses and the destination MAC address information in the protocol of the terminals 15 with those of the terminals 22 and forward (changing the output ports) those of the terminals 22 to the terminals 22A, 22B, . . . in the honey network system 2.

For an ARP frame from the terminal 15C infected with malware to the NAT router 12, copy and forward the ARP frame to the NAT router 12 and the OpenFlow switch 10a. The OpenFlow switch 10a replaces the destination MAC address and the destination MAC address information in the protocol of the NAT router 12 with those of the NAT router 20.

For communication from the terminal 15C infected with malware to the terminals 15A, 15B, . . . , forward (changing the output ports) the communication to the terminals 22A, 22B, . . . of the honey network system 2. At this point, replace the destination MAC addresses of the terminals 15A, 15B, . . . with those of the terminals 22A, 22B, . . . .

For communication from the terminal 22 of the honey network system 2 to the terminal 15C infected with malware, replace the source MAC address of the terminal 22 with that of the terminal 15.

For communication from the terminal 15C infected with malware to another subnet (for example, the server 14) of the company network system 1, forward (changing the output port) the communication to the NAT router 20 of the honey network system 2. At this point, replace the destination MAC address of the NAT router 12 with that of the NAT router 20.

For communication from the server 23 of the honey network system 2 to the terminal 15C infected with malware, replace the source MAC address of the NAT router 20 with that of the NAT router 12.

For communication destined for the external network 3 from the terminal 15C infected with malware, permit passage of the communication remaining unchanged (maintaining the communication path as in the normal mode).

Thereby, in the deception mode, the terminal 15C infected with malware is isolated into the honey network system 2 by the OpenFlow switch 10 and the OpenFlow switch 10a. For example, the terminal 15C infected with malware is not physically shifted from the company network system 1 to the honey network system 2 but is logically shifted as if the terminal 15C were in the honey network system 2 on the network.

In this way, the terminal 15C infected with malware is isolated into the honey network system 2, and therefore an attack using the terminal 15C as a jump server may be inhibited from reaching other devices in the company network system 1. Accordingly, the user (for example, a network administrator) of the company network system 1 may safely monitor the behavior of the terminal 15C infected with malware and may safely collect CTI.

Figure 3:
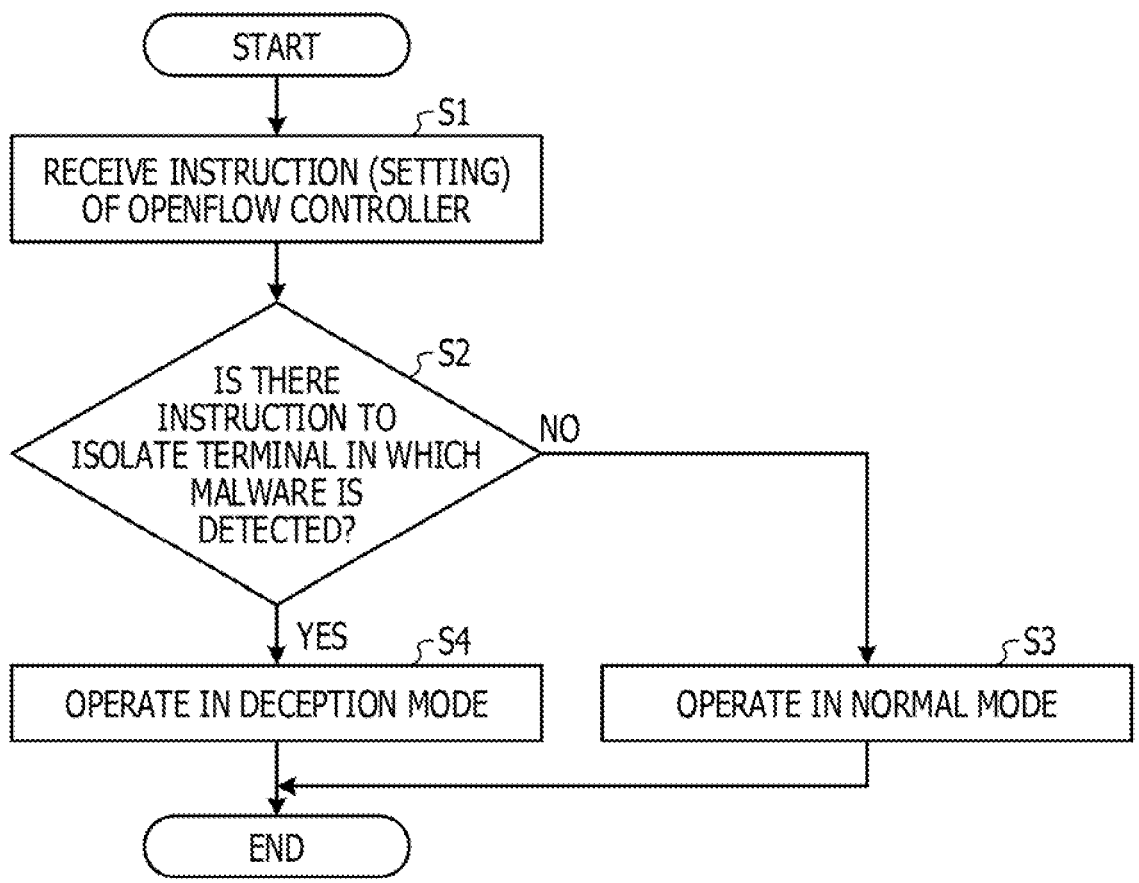
FIG. 3 is a flowchart illustrating an example of operations of a communication device according to an embodiment.

The operations of the OpenFlow switch 10 and the OpenFlow switch 10a will now be described in detail. FIG. 3 is a flowchart illustrating an example of operations of the OpenFlow switch 10 and the OpenFlow switch 10a according to the embodiment. As illustrated in FIG. 3, upon start-up of the process, the control unit 102 receives an instruction (setting) of the OpenFlow controller 11 (S1) and stores the instructed flow table 103A in the storage unit 103.

For setting of the flow table 103A, the flow table 103A that supports the normal mode and, for every terminal 15, the flow table 103A for switching to the deception mode may be stored in advance in the storage unit 103. In this case, in S1, an instruction whether to maintain the normal mode or to cause a given terminal 15 to switch to the deception mode is received.

Subsequently, under the instruction received in S1, the control unit 102 determines whether there is an instruction to isolate the terminal 15 in which malware is detected (for example, the terminal 15C) (S2).

For example, if the received instruction indicates the flow table 103A that supports the normal mode (S2: NO), the control unit 102 references the instructed flow table 103A and operates in the normal mode (S3).

If the received instruction indicates the flow table 103A that supports the deception mode for isolating the terminal 15C infected with malware (S2: YES), the control unit 102 references the instructed flow table 103A and operates in the deception mode (S4).

Figure 4:
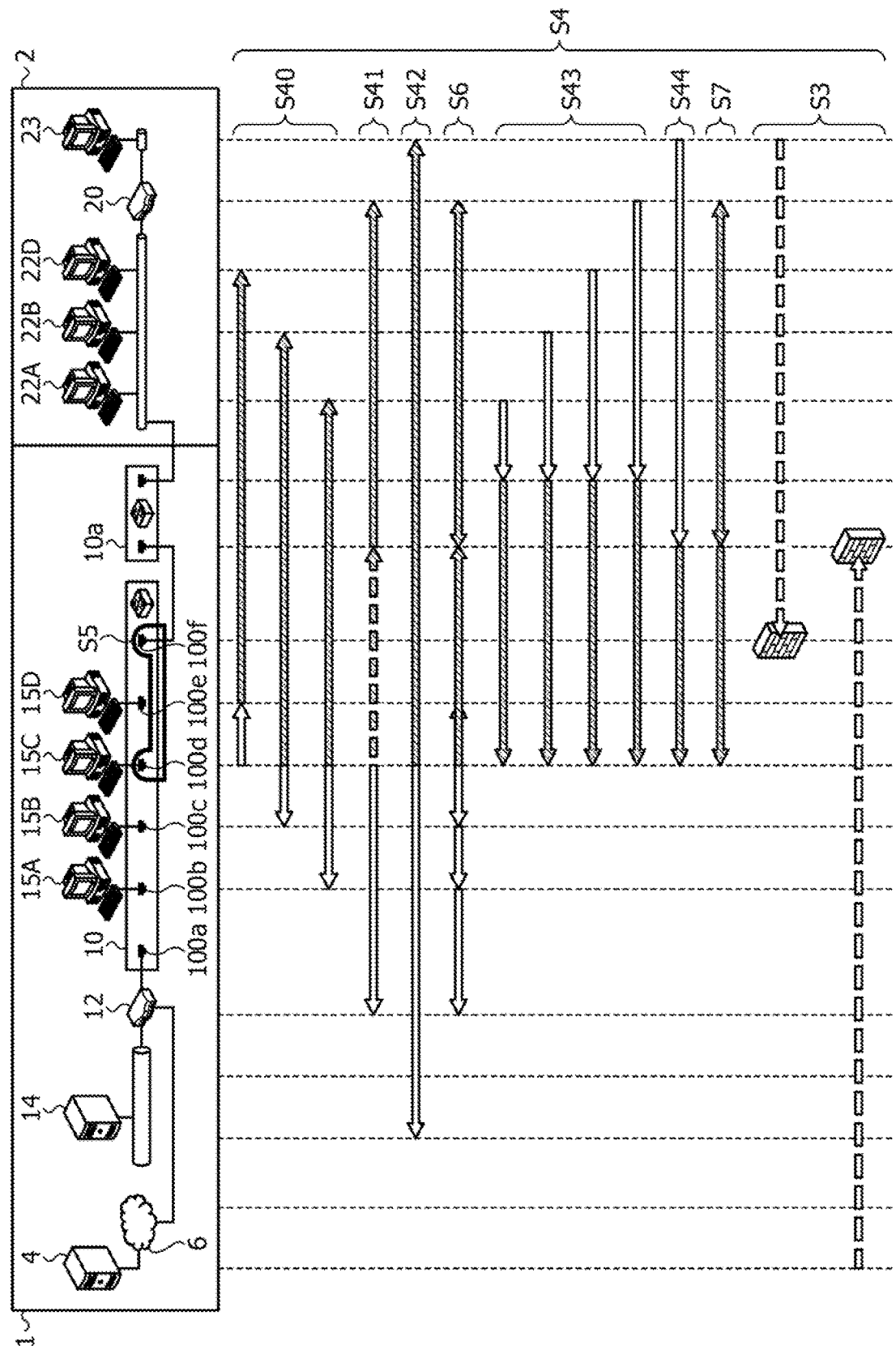
FIG. 4 is a diagram illustrating operations in a normal mode and in a deception mode.

FIG. 4 is a diagram illustrating operations in the normal mode and in the deception mode. As illustrated in FIG. 4, in the normal mode (S3), sending and receiving of packets between the company network system 1 and the honey network system 2 is interrupted in the OpenFlow switch 10 and in the OpenFlow switch 10a. Sending and receiving of packets is permitted within the company network system 1.

Figure 5:
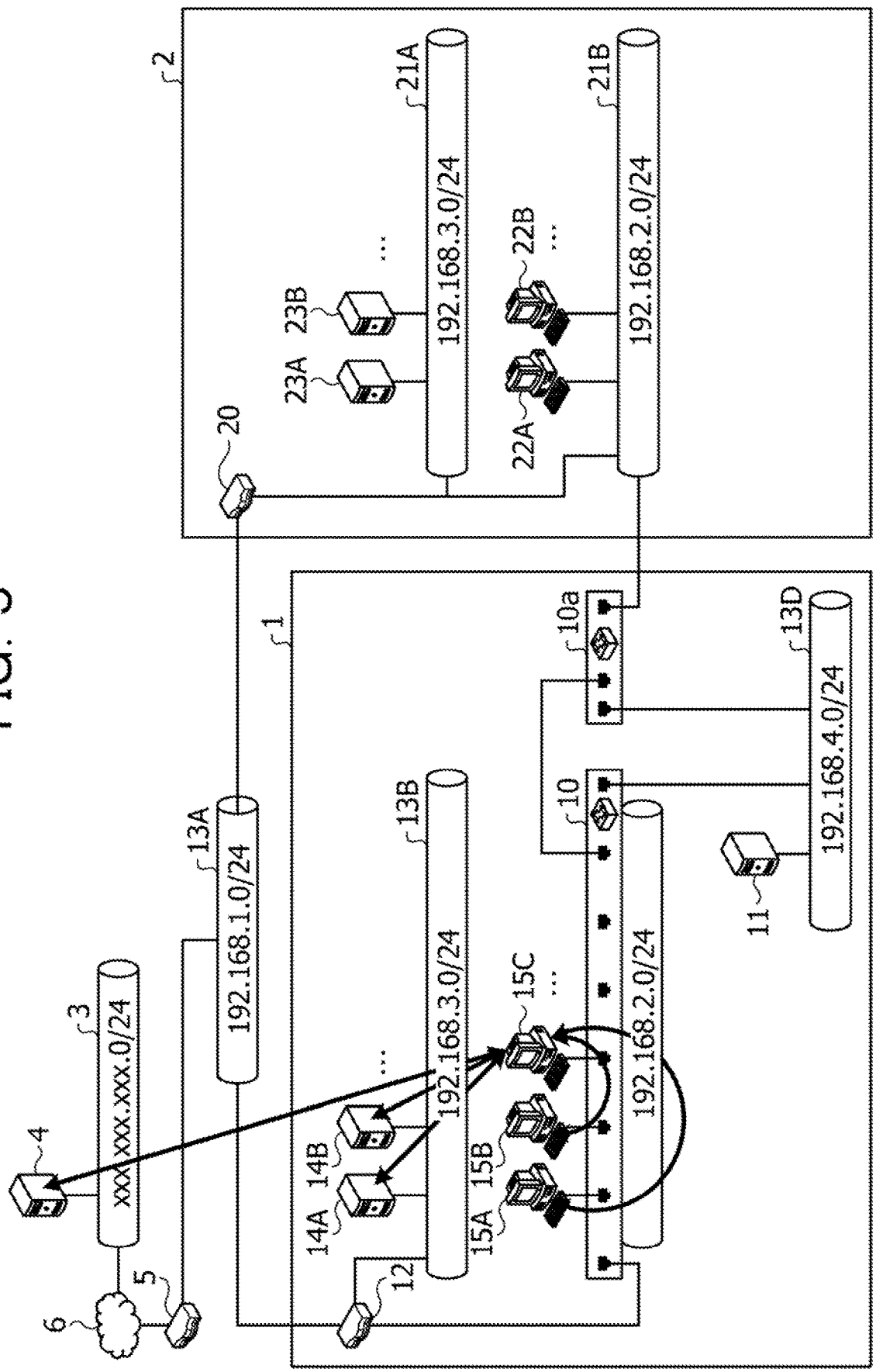
FIG. 5 is a diagram illustrating communication in a normal mode.

FIG. 5 is a diagram illustrating communication in the normal mode. As Illustrated in FIG. 5, in the normal mode, communication, for example, from the terminal 15C to the servers 14A, 14B, . . . , the terminals 15A, 15B, . . . , and the external network 3 is permitted.

Referring back to FIG. 4, in the deception mode (S4), for communication from the terminals 22A, 22B, . . . and the NAT router 20 of the honey network system 2 to the terminal 15C infected with malware (S43), the OpenFlow switch 10 replaces the source MAC addresses of the terminals 22A, 22B, . . . and the NAT router 20 with those of the terminals 15A, 15B, . . . and the NAT router 12 and forwards the communication to the terminal 15C. For an ARP frame, the source MAC address information in the protocol of the terminals 22A, 22B, . . . and the NAT router 20 is also replaced with that of the terminals 15A, 15B, . . . and the NAT router 12. For an NDP packet, in the case of Neighbor Solicitation, the source MAC address information in the protocol of the terminals 22A, 22B, . . . and the NAT router 20 is replaced with that of the terminals 15A, 15B, . . . and the NAT router 12. In the case of Neighbor Advertisement, the destination MAC address information in the protocol of the terminals 22A, 22B, . . . and the NAT router 20 is replaced with that of the terminals 15A, 15B, . . . and the NAT router 12.

For communication from the terminal 15C infected with malware to the terminals 15A, 15B, . . . (S40), the OpenFlow switch 10 forwards (changing the output ports) the communication to the terminals 22A, 22B, . . . of the honey network system 2. At this point, the destination MAC addresses of the terminals 15A, 15B, . . . are replaced with those of the terminals 22A, 22B, . . . . For an ARP frame, the destination MAC address information in the protocol of the terminals 15A, 15B, . . . is replaced with that of the terminals 22A, 22B, . . . .

The OpenFlow switch 10 and the OpenFlow switch 10a copy communication from the terminal 15C infected with malware to the NAT router 12 (S41) and forward (with a plurality of output ports) the copied communication to the NAT router 20 of the honey network system 2. At this point, the destination MAC address of the NAT router 12 is replaced with that of the NAT router 20. In the case of an ARP frame, the destination MAC address information in the protocol of the NAT router 12 is also replaced with that of the NAT router 20.

For communication from the terminal 15C infected with malware to the server 14 (S42), the OpenFlow switch 10 and the OpenFlow switch 10a forward (changing the output port) the communication to the NAT router 20 of the honey network system 2. At this point, the destination MAC address of the NAT router 12 is replaced with that of the NAT router 20. Thereby, the communication from the terminal 15C infected with malware to the server 14 is forwarded to the server 23.

For communication from the server 23 of the honey network system 2 to the terminal 15C infected with malware (S44), the OpenFlow switch 10 replaces the source MAC address of the NAT router 20 with that of the NAT router 12 and sends the communication to the terminal 15C.

Figure 6:
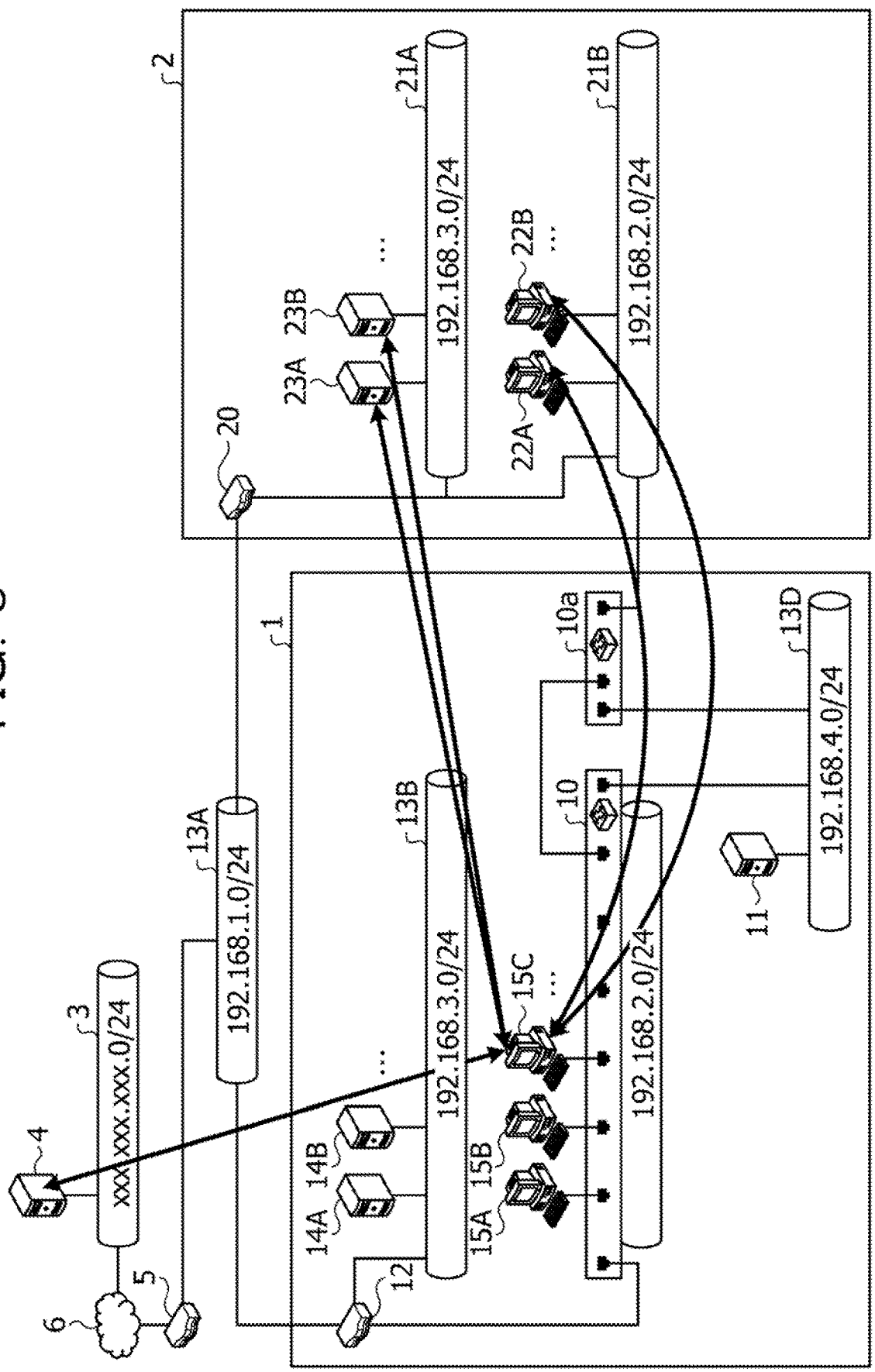
FIG. 6 is a diagram illustrating communication in a deception mode.
Figure 7:
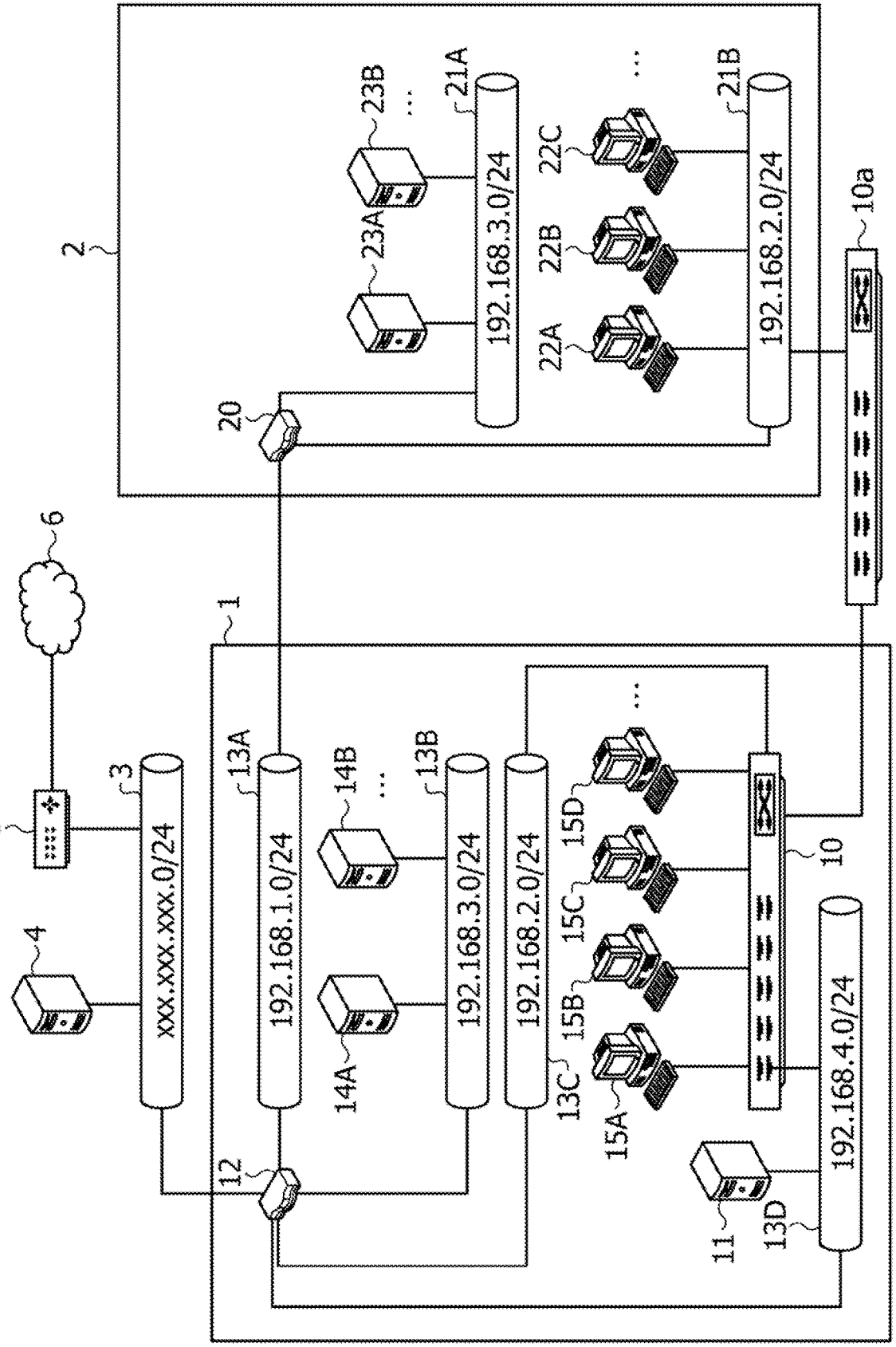
FIG. 7 is a diagram illustrating an example of a configuration of a system.

FIG. 6 is a diagram illustrating communication in the deception mode. As illustrated in FIG. 6, in the deception mode, the terminal 15C infected with malware is logically shifted as if the terminal 15C were in the honey network system 2 on the network.

For example, communication from the terminal 15C to the servers 14A and 14B is forwarded to the servers 23A and 23B, which correspond to the servers 14A and 14B, in the honey network system 2. For example, communication from the terminal 15C to the terminals 15A and 15B is forwarded to the terminals 22A and 22B, which correspond to the terminals 15A and 15B, in the honey network system 2. Communication from the terminal 15C destined for the external network 3 (for example, communication to the C&C server 4) is permitted to remain unchanged.

As described above, the OpenFlow switch 10 and the OpenFlow switch 10a include the receiving processing unit 102A that receives packets sent by the information processing device (the terminal 15 or the terminal 22) belonging to the company network system 1 or the honey network system 2. The OpenFlow switch 10 includes the sending processing unit 102B. When receiving packets destined for the server 14 and the terminals 15A, 15B, . . . from the terminal 15C that belongs to the company network system 1 and in which malware is detected, the sending processing unit 102B sends the packets in such a way that the destination addresses of the packets are changed to addresses corresponding to the server 23 and the terminals 22A, 22B, . . . belonging to the honey network system 2.

Thus, the OpenFlow switch 10 and the OpenFlow switch 10a forward access to the inside of the company network system 1 from the terminal 15C infected with malware in the company network system 1 to the honey network system 2, and thereby may inhibit an attack using the terminal 15 as a jump server from reaching other devices in the company network system 1. Accordingly, the user (for example, a network administrator) of the company network system 1 may safely monitor the behavior of the terminal 15C infected with malware and may safely collect CTI.

When receiving packets destined for the terminal 15C from the terminals 22A and 22B belonging to the honey network system 2, the sending processing unit 102B sends the packets to the terminal 15C in such a way that the source addresses (for example, the MAC addresses) are changed to addresses corresponding to the terminals 15A and 15B belonging to the company network system 1. When receiving a packet destined for the terminal 15C via the NAT router 20 from the server 23 belonging to the honey network system 2, the sending processing unit 102B sends the packet to the terminal 15C in such a way that the source address (for example, the MAC address) is changed to an address corresponding to the NAT router 12 belonging to the company network system 1. Thereby, the OpenFlow switch 10 may forward, to the terminal 15C, access to the terminal 15C from the terminals 22A and 22B and the server 23 belonging to the honey network system 2.

When a packet received from the terminal 15C infected with malware in the company network system 1 is destined for the external network 3, the sending processing unit 102B sends the packet without changing the destination address of the packet. This enables the OpenFlow switch 10 to continue communication between the terminal 15C infected with malware and the C&C server 4. Accordingly, the user (for example, a network administrator) of the company network system 1 may monitor the behavior of the terminal 15C in a situation where communication between the terminal 15C infected with malware and the C&C server 4 is continued.

When the sending processing unit 102B receives a packet destined for the terminal 15A from the terminal 15C in which malware is detected, the sending processing unit 102B changes the destination address (for example, the MAC address) of the packet to an address corresponding to the terminal 22A, which mimics the terminal 15A, to send the packet to the terminal 22A. This enables the user (for example, a network administrator) to monitor access from the terminal 15C, in which malware is detected, to the inside of the honey network system 2, which mimics the company network system 1, to safely collect CTI.

The OpenFlow controller 11 adds the following content to the flow table 103A for performing operations in the deception mode and sets the flow table 103A in the OpenFlow switch 10. Thereby, the OpenFlow switch 10 deals with broadcast packets related to an information processing device (for example, the terminal 15C) infected with malware.

For example, the following content is added to the setting of the flow table 103A described above.

Group a port to which the honey network system 2 is coupled with a port to which an information processing device (for example, the terminal 15C) infected with malware is coupled.

When a broadcast packet, such as an ARP frame, is received from an information processing device infected with malware, send the broadcast packet to the grouped port.

When a broadcast packet is received from an information processing device (for example, the terminal 22A or 22B) belonging to the honey network system 2, change the source address (MAC address) of the broadcast packet to the address of the information processing device (the terminal 15A or 15B corresponding to the terminal 22A or 22B) belonging to the company network system 1. In the case where the broadcast packet is an ARP packet, change the source MAC address in the protocol to the MAC address of an information processing device belonging to the company network system 1. In the case of an NDP packet, change the source MAC address information in the protocol to the MAC address of an information processing device belonging to the company network system 1. Subsequently, send to the grouped port the broadcast packet whose address has been changed.

Thereby, in the deception mode, broadcast packets related to an information processing device (for example, the terminal 15C) infected with malware are also isolated into the honey network system 2 by the OpenFlow switch 10. Accordingly, the user (for example, a network administrator) of the company network system 1 may safely monitor the behavior of an information processing device infected with malware and may safely collect CTI.

Detailed operations of the OpenFlow switch 10 that isolates broadcast packets related to an information processing device infected with malware will be described. In a modification, it is assumed that the terminals 15A, 15B, 15C, 15D, . . . in the company network system 1 belong to the network 13C of 192.168.2.0/24. It is also assumed that the terminal 15C is a terminal infected with malware. It is also assumed that the terminals 22A, 22B, 22C, . . . in the honey network system 2, which mimic the terminals 15A and 15B and 15D, . . . other than the terminal 15C infected with malware, belong to the network 21B of 192.168.2.0/24.

As illustrated in FIG. 4, under the setting of the flow table 103A, the control unit 102 of the OpenFlow switch 10 begins a process in the deception mode to deal with the terminal 15C infected with malware.

In the deception mode, the control unit 102 performs S5 to S7 in addition to S4 described above. For example, the control unit 102 groups, among ports 100a to 100f, the port 100d of the terminal 15C infected with malware and the port 100f to which the OpenFlow switch 10a on the side of the honey network system 2 is coupled, as ports belonging to the same group (S5).

When the control unit 102 receives broadcast packets from the terminal 22A, 22B, and 22C belonging to the honey network system 2 (S7), the control unit 102 changes the source addresses (MAC addresses) of the broadcast packets to the addresses of the terminals 15A, 15B, and 15D corresponding to the terminals 22A, 22B, and 22C. In the case where the broadcast packets are ARP packets, the control unit 102 changes the source MAC addresses in the protocol to the addresses of the terminals 15A, 15B, and 15D corresponding to the terminals 22A, 22B, and 22C. In the case of NDP packets, the control unit 102 changes the source MAC address information in the protocol to the addresses of the terminal 15A, 15B, and 15D corresponding to the terminal 22A, 22B, and 22C. Subsequently, the control unit 102 sends to the grouped port the broadcast packets whose addresses have been changed. For example, subsequently, the sending processing unit 102B sends to the grouped port 100d the broadcast packets whose addresses have been changed.

When a broadcast packet is received from the terminal 15C infected with malware (S6), the sending processing unit 102B sends the broadcast packet to the grouped port 100f grouped with the port 100d of the terminal 15C. At this point, the sending processing unit 102B does not send the broadcast packet to the ports 100b, 100c, and 100e of the terminals 15A, 15B, and 15D, which are not grouped with the port 100d of the terminal 15C.

Figure 8:
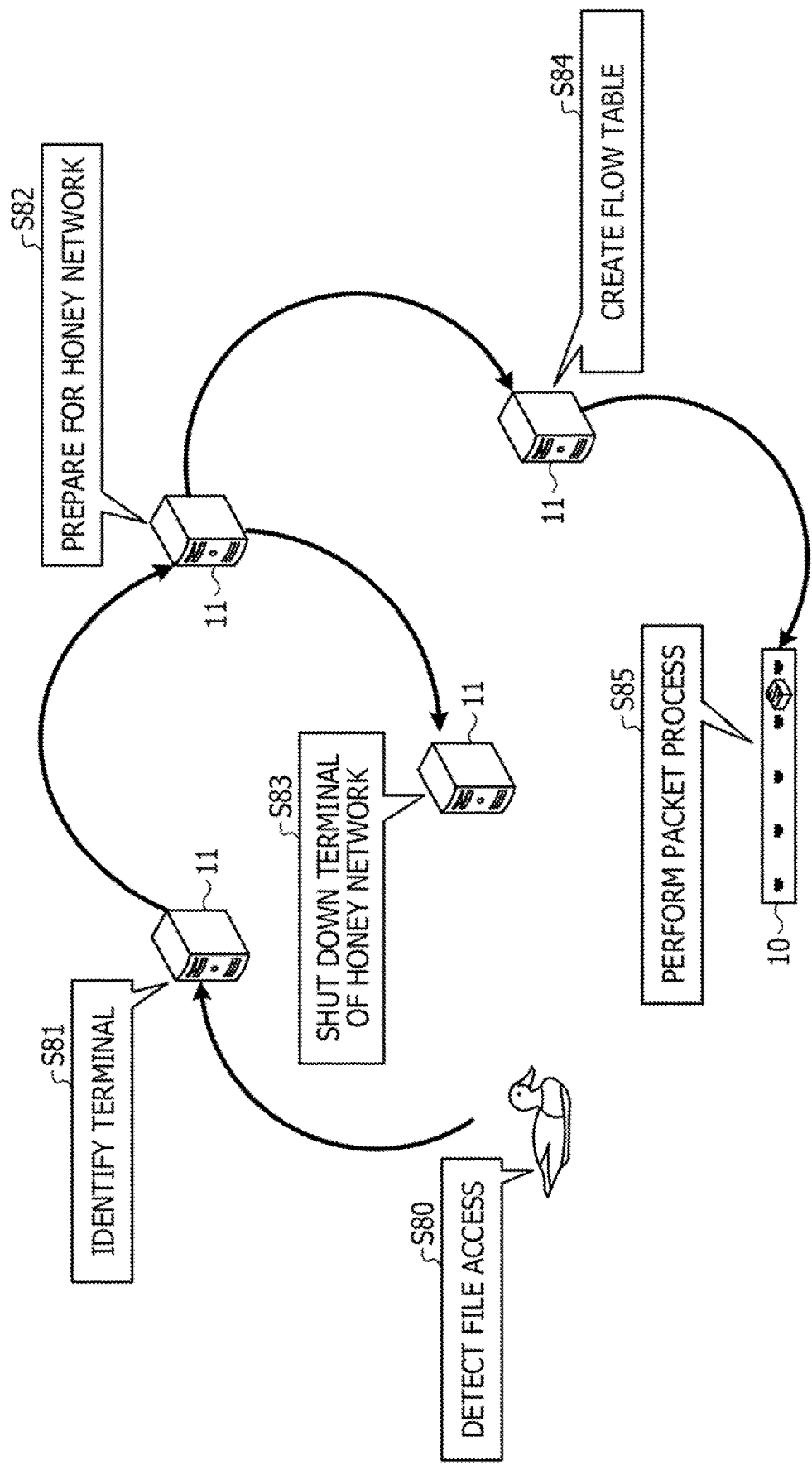
FIG. 8 is a diagram illustrating an example of an isolation procedure.

The OpenFlow controller 11 may detect the terminal 15 infected with malware and automatically isolate the detected terminal 15 into the honey network system 2. FIG. 8 is a diagram illustrating an example of an isolation procedure and, for example, is a diagram illustrating a procedure of automatically detecting and isolating the terminal 15 infected with malware.

As illustrated in FIG. 8, the OpenFlow controller 11, for example, detects a file access to a predetermined file stored, as a decoy for malware, in a file server or the like (S80). Thereby, the OpenFlow controller 11 detects that the terminal 15 in the company network system 1 has become infected with malware.

Subsequently, the OpenFlow controller 11 identifies the terminal 15 infected with malware by using a log search engine (581). Subsequently, the OpenFlow controller 11 makes preparations such as starting-up a honey network system 2 corresponding to the company network system 1 (S82). The OpenFlow controller 11 subsequently shuts down the terminal 22 of the honey network system 2 corresponding to the terminal 15 identified from the inside of the company network system 1 (S83).

The process regarding preparation of the honey network system 2 and the process of shutting down the terminal 22 of the honey network system 2 may be performed by a controller (for example, a deception controller or a hypervisor) other than the OpenFlow controller 11.

The OpenFlow controller 11 subsequently creates the flow table 103A for logically shifting the terminal 15 infected with malware as if this terminal 15 were in the honey network system 2 (S84).

The OpenFlow controller 11 sets the created flow table 103A in the OpenFlow switch 10. Thereby, in the OpenFlow switch 10, the packet process in the deception mode described above is performed, so that the terminal 15C infected with malware is isolated into the honey network system 2 (S85).

As described above, the OpenFlow switch 10 includes the receiving processing unit 102A that receives a packet sent by the information processing device (the terminal 15 or the terminal 22) belonging to the company network system 1 or the honey network system 2. The OpenFlow switch 10 includes the sending processing unit 102B. When receiving packets destined for the server 14 and the terminals 15A, 15B, . . . from the terminal 15C that belongs to the company network system 1 and in which malware is detected, the sending processing unit 102B sends the packets in such a way that the destination addresses of the packets are changed to addresses corresponding to the server 23 and the terminals 22A, 22B, . . . belonging to the honey network system 2. The sending processing unit 102B groups the port 100d to which the terminal 15C, in which malware is detected, is coupled and the port 100f to which the honey network system 2 is coupled. When receiving a broadcast packet from the terminal 15C infected with malware, the sending processing unit 102B sends the broadcast packet to the grouped port 100f. When receiving a broadcast packet from information processing device (for example, the terminal 22A or 22B) belonging to the honey network system 2, the sending processing unit 102B changes the source address (MAC address) of the broadcast packet to the address of the terminal 15A, 15B, . . . belonging to the company network system 1 and sends the broadcast packet to the grouped port 100d.

Thus, the OpenFlow switch 10 isolates broadcast packets related to the terminal 15C infected with malware in the company network system 1 into the honey network system 2, and thereby may inhibit the effect of the broadcast packets from reaching other devices in the company network system 1. Accordingly, the user (for example, a network administrator) of the company network system 1 may safely monitor the behavior of the terminal 15C infected with malware and may safely collect CTI.

Each component of each device illustrated in the drawings may not be physically configured as strictly as illustrated in the drawings. That is, the specific forms of distribution and integration of devices are not limited to those illustrated in the drawings, and all or some of the devices may be configured to be functionally or physically distributed and integrated in arbitrary units in accordance with various loads and usage states.

Regarding various processing functions performed in the company network system 1, all or any part of the various processing functions may be executed on a central processing unit (CPU) (or a microcomputer such as a microprocessor unit (MPU) or a microcontroller unit (MCU)). It is to be understood that all or any part of the various processing functions may be executed on programs analyzed and executed by a CPU (or a microcomputer such as an MPU or an MCU) or on hardware using wired logic.

Figure 9:
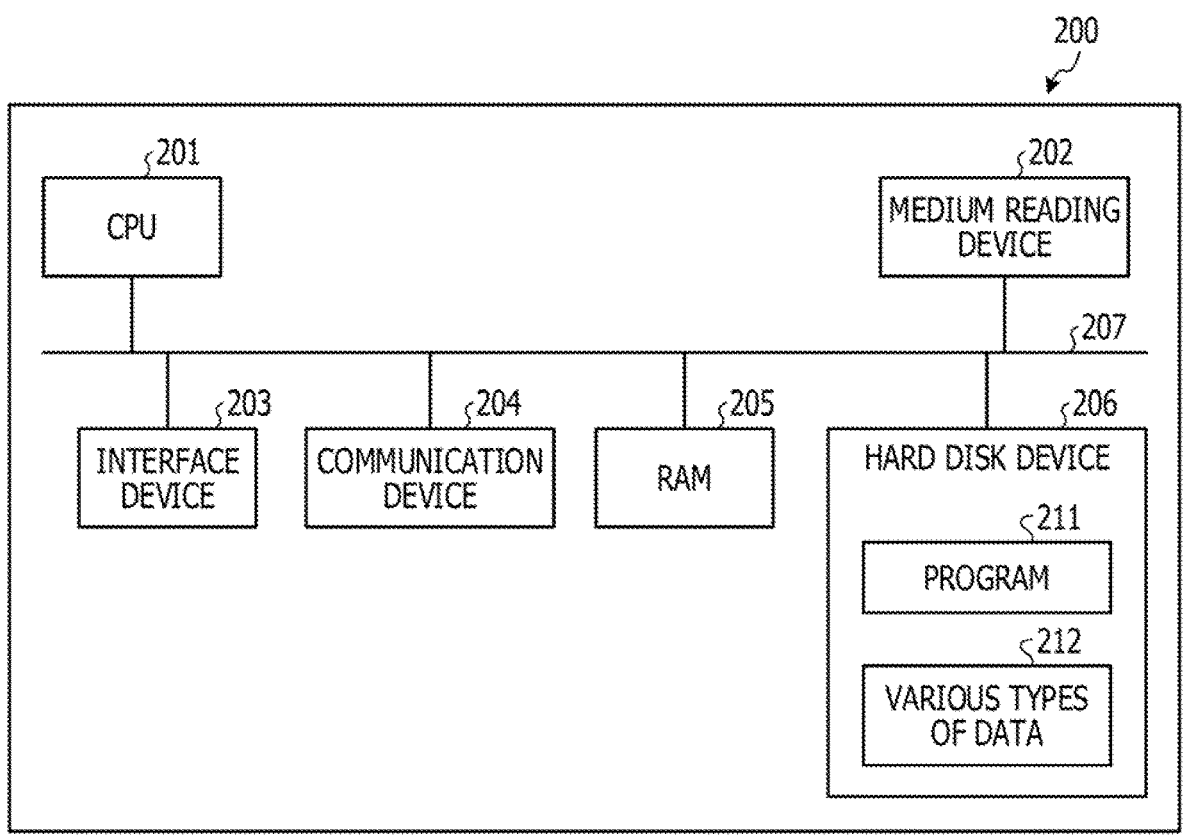
FIG. 9 is a block diagram illustrating an example of a hardware configuration of an information processing device according to an embodiment.

Various processes described in the above embodiment may be implemented by executing programs prepared in advance by a computer. Hereinafter, an example of a computer (hardware) that executes programs having functions similar to those of the above embodiment will be described. FIG. 9 is a block diagram illustrating an example of a hardware configuration of an information processing device (or a communication device such as the OpenFlow switch 10) according to the embodiment.

As illustrated in FIG. 9, an information processing device 200 includes a CPU 201, which executes various computation processes, and a medium reading device 202, which reads programs and the like from a recording medium. The information processing device 200 includes an interface device 203 for coupling to various devices and a communication device 204 for communicative coupling to external devices in a wired or wireless manner. The information processing device 200 includes a random-access memory (RAM) 205 that temporarily stores various types of information, and a hard disk device 206. The units (201 to 206) in the information processing device 200 are coupled to a bus 207.

In the hard disk device 206, a program 211 for executing various processes by the receiving processing unit 102A and the sending processing unit 102B in the control unit 102 described in the above embodiment is stored. Various types of data 212 that is referenced by the program 211 is stored in the hard disk device 206. The communication device 204, which is coupled to the networks 13C, 13D, and 21B and the like, such as local area networks (LANs), exchange various types of information between devices via the networks 13C, 13D, and 21B.

The CPU 201 reads the program 211 stored in the hard disk device 206, loads the program 211 into the RAM 205, and executes the program 211, performing various processes. The program 211 may not be necessarily stored in the hard disk device 206. For example, the information processing device 200 may read and execute the program 211 stored in a readable storage medium. The storage medium readable by the information processing device 200 corresponds to, for example, a portable recording medium such as a compact disc read-only memory (CD-ROM), digital video disc (DVD), or Universal Serial Bus (USB) memory, a semiconductor memory such as flash memory, a hard disk drive, or the like. The program 211 may be stored in a device coupled to a public line, the Internet, a LAN, or the like, and the information processing device 200 may read the program 211 from the device and execute the program 211.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various

What is claimed is:

1. A malware inspection support system comprising:
one or more memories; and
one or more processors coupled to the one or more memories and the one or more processors configured to:
when a first terminal belonging to a first system is infected with malware, in response to receiving, from the first terminal, a first packet destined for a second terminal belonging to the first system, change a destination address of the first packet to an address of a third terminal belonging to a second system, and transmit the changed first packet to the third terminal,
generate a port group by grouping a first port to which the first terminal is coupled and a second port to which the second system is coupled,
in response to receiving a broadcast packet from the first terminal, transmit the broadcast packet to the port group, and
in response to receiving another broadcast packet from the third terminal, change a source address of the other broadcast packet to an address of the second terminal, and transmit the changed other broadcast packet to the port group.

2. The malware inspection support system according to claim 1, wherein the broadcast packet is an Address Resolution Protocol (ARP) or Neighbor Discovery Protocol (NDP) packet.

3. The malware inspection support system according to claim 1, wherein the source address of the other broadcast packet is a media access control (MAC) address of the third terminal.

4. The malware inspection support system according to claim 1, wherein
the second system is a system that mimics the first system, and
the third terminal is a terminal that mimics the second terminal.

5. A computer-implemented malware inspection support method comprising:
when a first terminal belonging to a first system is infected with malware, in response to receiving, from the first terminal, a first packet destined for a second terminal belonging to the first system, changing a destination address of the first packet to an address of a third terminal belonging to a second system, and transmitting the changed first packet to the third terminal;
generating a port group by grouping a first port to which the first terminal is coupled and a second port to which the second system is coupled;
in response to receiving a broadcast packet from the first terminal, transmitting the broadcast packet to the port group; and
in response to receiving another broadcast packet from the third terminal, changing a source address of the other broadcast packet to an address of the second terminal, and transmitting the changed other broadcast packet to the port group.

6. The malware inspection support method according to claim 5, wherein the broadcast packet is an Address Resolution Protocol (ARP) or Neighbor Discovery Protocol (NDP) packet.

7. The malware inspection support method according to claim 5, wherein the source address of the other broadcast packet is a media access control (MAC) address of the third terminal.

8. The malware inspection support method according to claim 5, wherein
the second system is a system that mimics the first system, and
the third terminal is a terminal that mimics the second terminal.

9. A non-transitory computer-readable medium storing instructions executable by one or more computers, the instructions comprising:
one or more instructions for, when a first terminal belonging to a first system is infected with malware, in response to receiving, from the first terminal, a first packet destined for a second terminal belonging to the first system, changing a destination address of the first packet to an address of a third terminal belonging to a second system, and transmitting the changed first packet to the third terminal;
one or more instructions for generating a port group by grouping a first port to which the first terminal is coupled and a second port to which the second system is coupled;
one or more instructions for, in response to receiving a broadcast packet from the first terminal, transmitting the broadcast packet to the port group; and
one or more instructions for, in response to receiving another broadcast packet from the third terminal, changing a source address of the other broadcast packet to an address of the second terminal, and transmitting the changed other broadcast packet to the port group.

10. The medium according to claim 9, wherein the broadcast packet is an Address Resolution Protocol (ARP) or Neighbor Discovery Protocol (NDP) packet.

11. The medium according to claim 9, wherein the source address of the other broadcast packet is a media access control (MAC) address of the third terminal.

12. The medium according to claim 9, wherein
the second system is a system that mimics the first system, and
the third terminal is a terminal that mimics the second terminal.

* * * * *